(12) United States Patent
Kirk (10) Patent No.: US 12,257,524 B2
(45) Date of Patent: Mar. 25, 2025

(54) TOY FIGURINE WITH A BATTERY COMPARTMENT

(71) Applicant: LEGO A/S, Billund (DK)

(72) Inventor: Henning Kirk, Billund (DK)

(73) Assignee: LEGO A/S, Billund (DK)

( * ) Notice: Subject to any disclaimer, the term of this patent is extended or adjusted under 35 U.S.C. 154(b) by 381 days.

(21) Appl. No.: 17/798,503

(22) PCT Filed: Mar. 10, 2021

(86) PCT No.: PCT/EP2021/056090
§ 371 (c)(1),
(2) Date: Aug. 9, 2022

(87) PCT Pub. No.: WO2021/180810
PCT Pub. Date: Sep. 16, 2021

(65) Prior Publication Data
US 2023/0088274 A1   Mar. 23, 2023

(30) Foreign Application Priority Data
Mar. 10, 2020   (DK) .................................. 2020 70160

(51) Int. Cl.
*A63H 3/36* (2006.01)
*A63H 3/00* (2006.01)
(Continued)

(52) U.S. Cl.
CPC ............ *A63H 3/36* (2013.01); *H01M 50/247* (2021.01); *H01M 50/262* (2021.01);
(Continued)

(58) Field of Classification Search
CPC . A63H 3/36; A63H 3/006; A63H 3/28; A63H 2200/00; A63H 33/26;
(Continued)

(56) References Cited

U.S. PATENT DOCUMENTS 4,083,011 A   4/1978   Ferrell et al.
4,221,454 A * 9/1980   Wong ..................... A63H 29/22
                                         439/500

(Continued)

FOREIGN PATENT DOCUMENTS

CN   202762082 U   3/2013
CN   103996812 A   8/2014

(Continued)

OTHER PUBLICATIONS

CN Office Action corresponding to Application No. 202180017593.0, dated Sep. 18, 2023, 8 pages.

(Continued)

*Primary Examiner* — Peter J Iannuzzi
(74) *Attorney, Agent, or Firm* — Day Pitney LLP; George Chaclas; Anthony A. Kassas (57) ABSTRACT

A battery compartment for a toy figurine including an elongate cavity configured to receive a battery. The battery compartment has a first spring connector defining a positive contact surface for connection to the battery received in the elongate cavity. The battery compartment also has a battery shoulder mounted to the spring connector. The battery shoulder defines a hole shaped to fit a positive terminal of the battery therethrough. The battery compartment includes a second siring connector defining a negative contact surface for connection to the battery received in the elongate cavity. The second spring connector is configured to elastically maneuver to lengthen the donate cavity.

13 Claims, 8 Drawing Sheets

(51) Int. Cl.
  *H01M 50/247* (2021.01)
  *H01M 50/262* (2021.01)
  *H01M 50/514* (2021.01)
  *A63H 3/28* (2006.01)

(52) U.S. Cl.
  CPC ........... *H01M 50/514* (2021.01); *A63H 3/006* (2013.01); *A63H 3/28* (2013.01); *A63H 2200/00* (2013.01); *H01M 2220/30* (2013.01)

(58) Field of Classification Search
  CPC ............ H01M 50/247; H01M 50/262; H01M 50/514; H01M 2220/30; Y02E 60/10
  See application file for complete search history.

(56) References Cited

U.S. PATENT DOCUMENTS

| | | | | |
|---|---|---|---|---|
| 5,071,716 | A | 12/1991 | Petzl et al. | |
| 5,114,376 | A | 5/1992 | Copley et al. | |
| 5,631,098 | A * | 5/1997 | Suzuki | H01M 50/588 |
| | | | | 429/96 |
| 7,052,799 | B2 * | 5/2006 | Zatezalo | H01M 50/24 |
| | | | | 429/96 |
| 8,067,109 | B2 * | 11/2011 | Zhang | H01M 50/216 |
| | | | | 429/100 |
| 2007/0042672 | A1 * | 2/2007 | Tawil | A63H 3/02 |
| | | | | 446/369 |
| 2013/0171489 | A1 | 7/2013 | Kobayashi et al. | |
| 2014/0168915 | A1 | 6/2014 | Wang | |
| 2014/0322581 | A1 | 10/2014 | Rüter et al. | |
| 2015/0037615 | A1 | 2/2015 | Xiao et al. | |

FOREIGN PATENT DOCUMENTS

| | | |
|---|---|---|
| CN | 104806987 A | 7/2015 |
| CN | 207588520 U | 7/2018 |
| CN | 209328976 U | 8/2019 |
| CN | 114142154 A | 3/2022 |
| DE | 9308807 U1 | 7/1994 |
| DE | 9412542 U1 | 1/1995 |
| JP | 61-140055 U | 8/1986 |
| JP | H0887993 A2 | 4/1996 |
| JP | 2020-98673 A | 6/2020 |
| KR | 20080015261 A | 2/2008 |

OTHER PUBLICATIONS

DK Office Action in Application No. PA 2020 70160, dated Sep. 3, 2020, 9 pages.
International Search Report and Written Opinion of the International Search Authority issued in corresponding International application No. PCT/EP2021/056090, May 26, 2021 (9 pages).

* cited by examiner

TOY FIGURINE WITH A BATTERY COMPARTMENT

CROSS-REFERENCE TO RELATED APPLICATIONS

The present application claims priority to Danish Patent Application No. PA202070076 dated Feb. 6, 2020, and is a U.S. national stage application under 35 U.S.C. 371 of co-pending International Application No. PCT/EP2021/052922 filed on Feb. 8, 2021, the contents of each are incorporated by reference herein in their entirety for all purposes.

FIELD OF THE DISCLOSURE

The present disclosure relates to a battery compartment of a toy figurine, and more particularly to a battery connection for providing an energy supply to electrical components of a toy figurine.

BACKGROUND

Today, toys for smaller children may include electronic devices. It is likely that such devices experience impacts during their use, or they may even be intended for games where impacts are part of the game. Such electronic devices may comprise a plurality of electrical components, such as sensors, cameras, electronic displays, microphones, electronic controllers, lights e.g. led light or loudspeakers, used to provide an interaction between the toy and the child/user. Such electronic components may need a stable, uninterrupted supply of e.g. DC electric energy of a specific polarity. It is often desirable that such devices may be powered by replaceable consumer type standard electric batteries. In other cases they may be powered by industry standard batteries. When replacing such batteries it may be necessary to secure a correct direction insertion of the batteries, since some of the electronic components may not function or be damaged if they are supplied with electric energy of the wrong polarity. Once the batteries have been correctly inserted it is necessary to secure that the terminals of the batteries are continuously connected to the electrical connectors of the circuit of which the electronic components are part of. Due to the above mentioned (intended) impacts common to some types of electric devices, for example toys, such as toy figurines, there is need for a stable, secure, one-way battery connection.

SUMMARY

It is therefore an object of the disclosure to solve the disadvantages of the prior art systems, and to increase the variety of options.

In a first aspect of the disclosure, a toy figurine includes one or more electronic components and a battery compartment for receiving a battery for powering the one or more electronic components, the battery compartment having an inner battery receiving space configured for receiving a battery; a first spring connector in the form of a leaf spring comprising a flat body, the first spring connector being provided at a first end of the battery compartment, and having a first electric contact surface configured for contacting a positive terminal of the battery and one end fixedly connected to a wall of the battery compartment;

a second spring connector provided at a second end of the battery compartment, and having a second electric contact surface configured for contacting a negative terminal of the battery and one end fixedly connected to a wall of the battery compartment; and a battery-shoulder receiving part movably arranged in the battery compartment, wherein the battery-shoulder receiving part is attached to a portion of the first spring connector;

wherein the battery-shoulder receiving part comprises an opening configured for receiving a knob protruding from a first end surface of said battery, the opening being formed in and through a first surface configured for abutting on the first end surface of the battery, and wherein the first contact surface is recessed relative to a rim between said opening and said first surface of the battery-shoulder receiving part, and wherein cooperating guide elements are formed between a wall of the battery compartment and the battery-shoulder receiving part, and configured to allow only linear translational movement of the battery-shoulder receiving part relative to the wall in a direction along a longitudinal axis of the battery compartment.

Thereby, a more stable translation of the battery-shoulder receiving part in the battery compartment is achieved. The first contact surface recessed from the opening formed in the battery-shoulder receiving part secures electrical contact only when the positive terminal of a battery is correctly inserted, and the battery-shoulder receiving part being connected to the first spring connector simultaneously secures a stable connection of the electric terminals of the battery when inserted in the battery compartment.

In a further embodiment thereof, the first spring connector comprises at least a first bend to provide a first portion and a second portion of the body parallel to the first portion, wherein the first portion extends from a wall of the battery compartment, and wherein the battery-shoulder receiving part is connectable to the second portion. In alternative embodiments the at least first bend may be provided by a coil of a coil spring.

In a further embodiment, the first contact surface of the first spring connector is provided on a third portion of the body which is resilient relative to the second portion of the body.

The distance between the first contact surface of the first spring connector and the first surface of the battery-shoulder receiving part is configured such that it is smaller than the height of the knob forming the positive pole on a battery, when the spring connector is in neutral position, i.e. when no load is applied thereto. Preferably, this distance is about ⅓ to ½ of the height of the knob forming the positive pole on a battery.

In a further embodiment the cooperating guide elements comprises a guide member extending from a sidewall of the battery compartment and a guide track formed in the battery-shoulder receiving part.

In a further embodiment the guide track is defined between a first peripheral flange formed at a first end of the battery-shoulder receiving part facing the internal space, and a second peripheral flange formed at a second end of the battery-shoulder receiving part facing away from the internal space of the battery compartment.

In either of the above embodiments, the first surface configured for abutting on the first end surface comprises a ledge. Thereby, a battery may more easily be inserted sideways into the battery compartment.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

as shown in FIG. 1, and illustrating a use of the toy figurine.

DETAILED DESCRIPTION

The subject technology overcomes many of the prior art problems associated with toy figurines. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Figure 1:
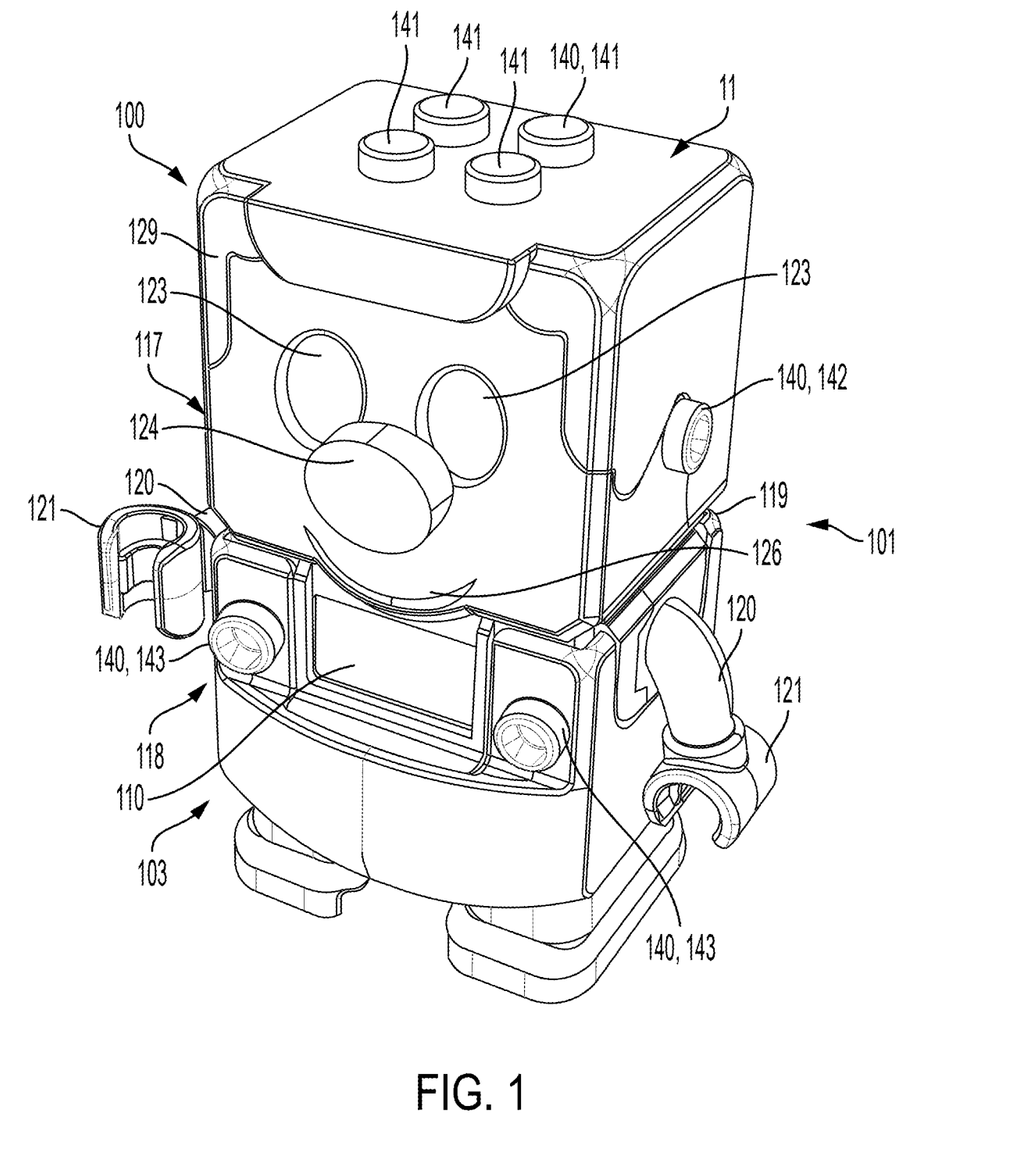
FIG. 1, in a perspective view, shows a toy figurine having a battery compartment with a battery connection according to an aspect of the disclosure.

FIG. 1, in a perspective view, shows a two part toy figurine, or simply toy figurine 100, according to an aspect of the disclosure. The toy figurine 100 may comprise as toy figurine first part 101 and a toy figurine second part 103. The toy figurine first part 101 may also be referred to simply as first part 101. The toy figurine second part 103 may also be referred to simply as second part 103. The first part 101 and the second part 103 are configured to be releasably connected to each other to form the toy figurine 100, which in FIG. 1 is shown in an assembled state, where the first part 101 and the second part 103 are connected to each other. The first part 101 and the second part 103 may be connected via suitable, not shown connection means.

As shown, the toy figurine 100 is of a type resembling a character such as human being, a toy human being. The character may alternatively be an animal, a toy animal, a fantasy creature, or the like.

Further, the toy figurine 100 is of a type is of a type comprising electronic components configured to enhance character traits relating to the character, which the toy figurine 100 is made to resemble. Such character traits may be represented by sounds, music, tactile e.g. vibration patterns, and light such as flashing lights etc.

For this purpose the toy figurine 100 is equipped with one or more electronic output components, such as one or more loud speaker, one or vibration devices, one or more light sources (such as LED), etc. For example, in an embodiment, and as shown in the FIGS. 1 and 2, the toy figurine 100 may comprise a digital screen 110. In embodiments, the electronic output components may be provided in the first part 101.

The toy figurine 100 may further be equipped with a suitable, not shown, electronic controller (a processor) electronically connected with the one or more electronic components for controlling the same, e.g. via a suitable wiring (not shown). In some embodiments the electronic controller may be provided in the first part 101.

Further, the toy figurine 100 may be equipped with one or more sensors (not shown), such as proximity sensors, vibration sensors, location sensors, sensors for detecting movement of the figurine, readers for detecting markers in a proximity of the toy figurine 100, cameras, etc. The one or more sensors may be connected to the electronic controller via suitable electrical connections, e.g. wiring (not shown). In some embodiments, one or more such sensors may be provided in the first part 101.

In an embodiment, the above mentioned digital screen 110 may be a touch screen, and be configured for both providing an output and for receiving an input from a user.

Further, the toy figurine 100 may comprise one or more (not shown) communication devices for communicating with other entities such as other similar toy figurines, computers, cell phones, etc. Such communication devices may comprise ports and/or wireless communication devices, such as blue tooth, Wi-Fi, etc. The one or more communication devices may be electronically connected to—and controlled by—the above mentioned electronic controller, via suitable electrical connections, e.g. wiring (not shown). In some embodiments, one or more such communication devices are provided in the first part 101.

Further, the toy figurine 100 may comprise a power source (not shown in FIG. 1, see FIGS. 4, 5, and 7), such as one or more electric batteries 10. The power source is configured for powering the one or more electronic output components, the one or more sensors, the one more communication devices and/or the electronic controller. For this purpose, the one or more batteries is/are connected via suitable electronic circuitry, e.g. wiring. In preferred embodiments the power source is provided in the first part 101.

Figure 3A:
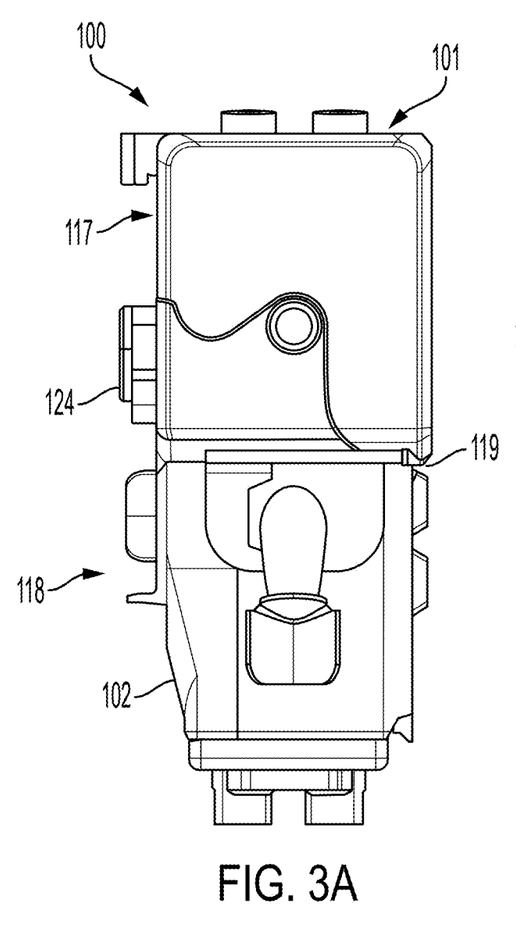
FIG. 3A, in a side view, shows a portion of the toy figurine of FIG. 1.
Figure 3B:
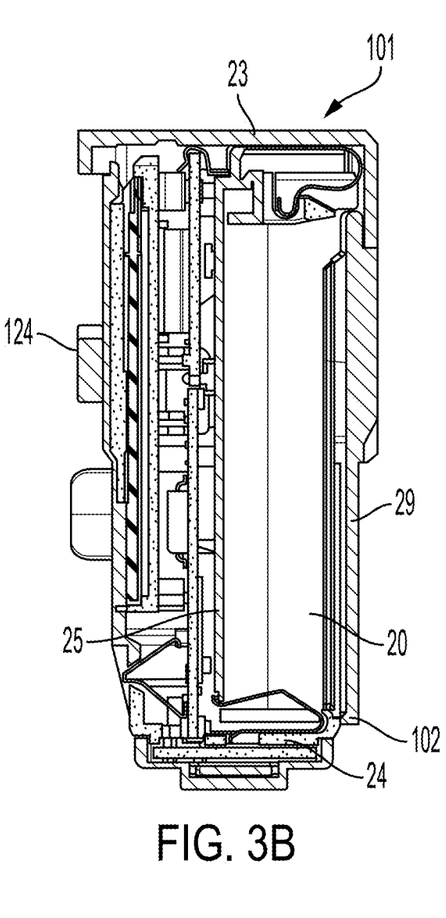
FIG. 3B shows a section through the toy figurine portion of FIG. 3A, thereby showing a battery compartment of the toy figurine, with spring connectors of a battery connection in a first position.
Figure 3C:
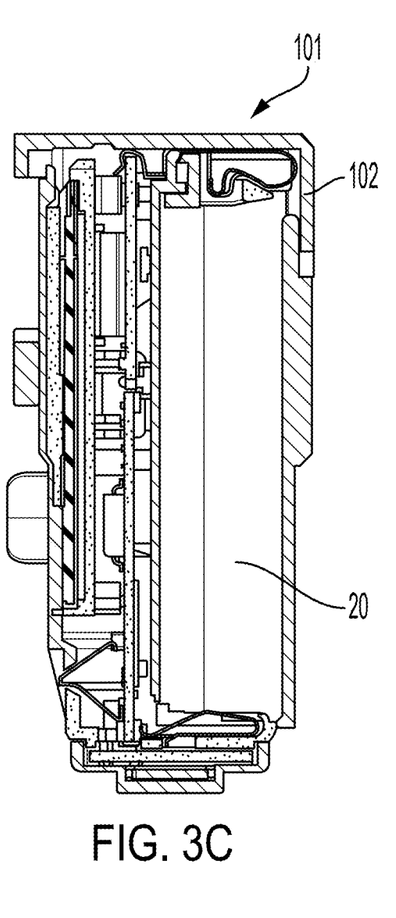
FIG. 3c shows a section through the toy figurine portion of FIG. 3A, thereby showing a battery compartment of the toy figurine, with spring connectors of the battery connection in a second position.

FIGS. 3A-C shows a first part 101 of a toy figurine 100, seen from the side. FIG. 3A shows a side view of the first part 101. FIGS. 3B-C shows sectional side views of the first part 101.

Figure 2:
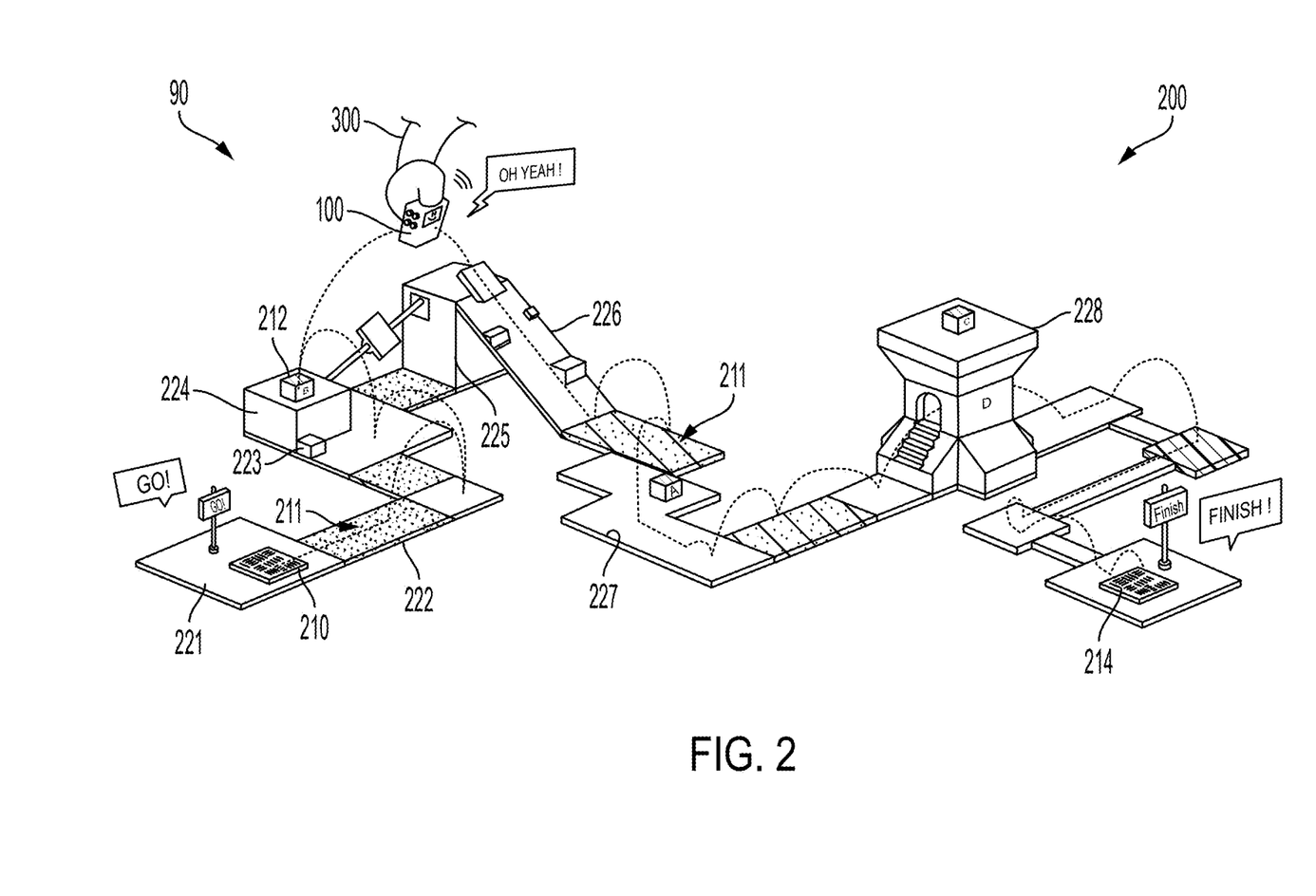
FIG. 2, in a perspective view, shows a play environment and a toy figurine e.g.

The first part 101 of the toy figurine 100 comprises a main portion or housing 102, see e.g. FIGS. 3A-C. The housing 102 of the first part 101 of the first toy figurine 100 may be essentially box shaped, as shown in FIGS. 1-3. The housing 102 comprises a battery compartment 20 enclosed in the housing 102, see FIGS. 3B, 3C. The housing 102 may further enclose a subset of the above mentioned electronic components. Some electronic components, such as various sensors may be arranged on outer surfaces or through outer walls of the housing 102.

The first part 101 of the toy figurine 100 may comprise a first/upper portion resembling a head 117 of the character, and a second/lower portion resembling a body 118 of the character which the toy figurine 100 is intended to look like/represent.

The first/upper portion resembling a head 117 and the second/lower portion 118 resembling a body may be visually distinguishable at least by a circumferential indentation 119 surrounding the housing 102, and resembling a neck of the character which the toy figurine 100 is intended to look like/represent.

The box shape of the housing 102 of the toy figurine first part 10 comprises a front surface, a back or rear surface parallel with and opposing the front surface, and two parallel and opposed side surfaces connected to the front surface and the back surface, and perpendicularly thereto. At the upper end, the front surface, the back or rear surface, and the side surfaces are connected to the upper surface, and at the lower end, the front surface, the back or rear surface, and the side surfaces are connected to the lower/bottom surface to form the essentially box shaped housing 102.

A hatch or cover 29 may be provided in e.g. the rear wall of the housing 102 to provide access to the battery compartment 20 in order to allow replacement the one or more power sources (batteries 10).

To make the appearance of a specific character, the housing 102 may be provided with ornamentations representative of certain characteristic features of the character, which the toy figurine 100 is supposed to resemble. The ornamentation may be provided e.g. by a colouring, or by integrated reliefs formed with the housing 102 or parts thereof, or a combination thereof.

As shown in FIGS. 1 and 3A-C such ornamentations may comprise a set of eyes 123, a nose 124, a mouth 126 and hair 127. In the embodiment shown in FIGS. 1 and 3, the mentioned features are shown as being formed as reliefs in the housing 102.

In the embodiment shown in FIG. 2, facial traits of a character, like mouth and eyes are indicated as being represented on a digital screen formed at the outer surface of the front surface of the toy figurine 100.

The toy figurine first part 101 may be provided with an arm 120 extending from each of the two side surfaces. The arms 120 may be rotationally connected to the housing 102. Further, each of the arms 120 may be provided with a hand 121. The hand 121 may be rotationally connected to the arm 120.

The hand 121 may as shown be formed as claw, with two flanges formed encircling a cylindrical space. The claw formed by the two flanges of the hand 121 thereby may form a connector configured for connecting to other construction toy parts (not shown) having at least portions that are cylindrical and dimensioned to cooperate with the connector by resilience of the two flanges of the claw forming the hand 121.

At the bottom surface of the housing 102, the first part 101 may be provided with first connection means (not shown), the first connection means being configured for cooperating with second connection means (not shown), formed in the toy figurine second part 103.

As shown in e.g. FIG. 1, the toy figurine first part 101 may be provided fifth connectors/connection means 140, e.g. in the form of knobs. As shown in FIG. 1 there may e.g. be formed four knobs on the upper/top surface of the housing 102 and protruding therefrom. As shown, the four knobs may be arranged in a 2×2 array.

Thereby, the fifth connection means/knobs 1400 may be used for connecting the first toy figurine part 101 to another toy construction element (not shown). For this purpose, the other toy construction element may be provided with sixth connection means (not shown), for example in the form of corresponding/cooperating indentations configured for cooperating with the knobs 140 as is known in the art of toy building/construction sets.

Each of the side surfaces of the first part 101 may be provided with one or more fifth connection means 140, 142. Further, the front surface of the second part 103 of the toy figurine 100 may be provided with one or more fifth connection means 140, 143. The one or more fifth connection means 140, 142, 143 e.g. in the form of knobs, may be used to connect other toy construction elements having sixth connection means as suggested above. FIG. 2 illustrates an example of a toy system 90 comprising a physical play environment 200 constructed from toy construction elements 221, 222, 223, 224, 225, 226, 227, 228. The toy system 90 further comprises a toy figurine 100, which a user 300 can move about in the physical play environment 200. The toy figurine 100 may be the toy figurine 100 as described above, and having a battery compartment 20 and a battery connection 1 as described below. The toy figurine 100 may further comprise an accelerometer (not shown) for detecting movements of the toy figurine 100 and an optical reader (not shown) configured to detect different types of markers, 210, 211, 212, 214: One type of marker 212 may include a visible code, such as a microdot pattern, a OR code or the like; while other markers 211 may be colored tiles or other colored toy construction elements 200. However, it will be appreciated that other types of markers, such as visible markers, RFID markers, etc. may be used. The toy figurine 100 resembles a character. In this example, the reader (not shown) is facing downwards, i.e. configured to detect markers onto or above which the toy figurine 100 is placed.

The user 300 may initiate a play activity by holding the toy figurine 100 in contact or dose proximity to a start marker 210. Responsive to detecting the start marker 210, the toy figurine 100 may enters an active play mode. In some embodiments, the toy system 1 includes different start markers 210, each indicative of a respective play activity. Alternatively or additionally, different play activities may be selected based on other criteria, e.g. a user input to the toy, communication with another toy figurine or with a processing device, based on previously completed play experiences, a progression level of the toy figurine, etc. A progression level may e.g. be stored by the toy figurine 100 and/or by a remote processing device (not shown) with which the toy figurine 100 is communicatively connected.

While in the active play state, the toy figurine 100 detects movements of the toy figurine 100 and it detects one or more markers 211, 212, e.g. toy construction elements having predetermined color(s) or other visual markers, when the toy figurine 5 is brought in proximity of said markers.

When the toy detects a finish marker 214, the toy exits the active play state and may compute a score which depends on the movements and markers that have been detected while the toy was in the active play state.

Moving the toy figurine 100 around in a physical play environment 200 as described above, causes the toy figurine 100 to be subjected to impacts with a floor a table or surfaces of the toy construction elements 221, 222, 223, 224, 225, 226, 227, 228. Using traditional battery connections, there is a risk that the electrical power to one or more of the above mentioned electric components of the toy figurine 100 is cut off by such impacts. This may cause malfunction of the controller/processor and/or other electric components, thereby risking that the play experience is interrupted, reset, or stopped altogether.

In order to function stably many of the electronic components mentioned above requires a stable, unabrupted power supply. A stable power supply may be achieved by a battery connection 1 according to one aspect of the disclosure.

Such a battery connection 1 may be applied in connection with a toy figurine 100 as described in connection with FIGS. 1-3 above. However, the inventive battery connection 1 may be utilized in other battery compartments as well, particularly in other impact prone applications.

Figure 4A:
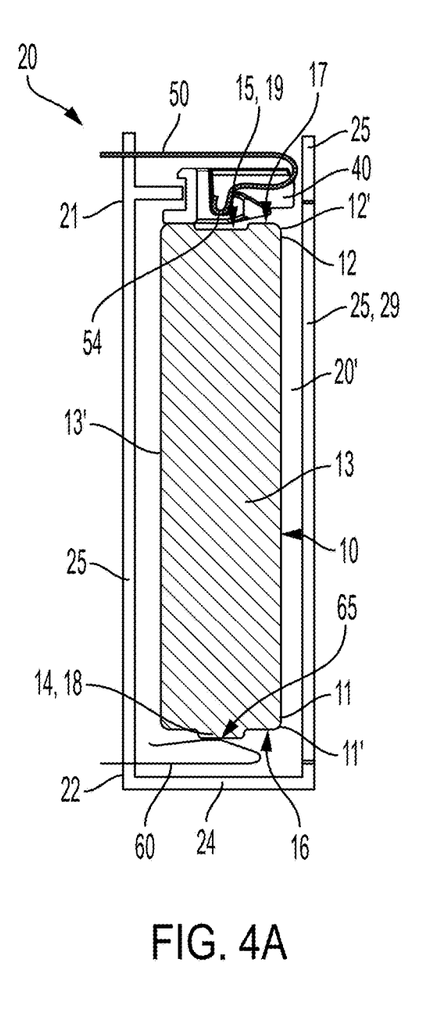
FIG. 4A, in a side sectional view, shows a battery compartment and a battery with a battery connection according to an embodiment of the disclosure, wherein the battery is inserted upside down and wherein the battery is in a neutral position relative to the battery compartment.
Figure 4B:
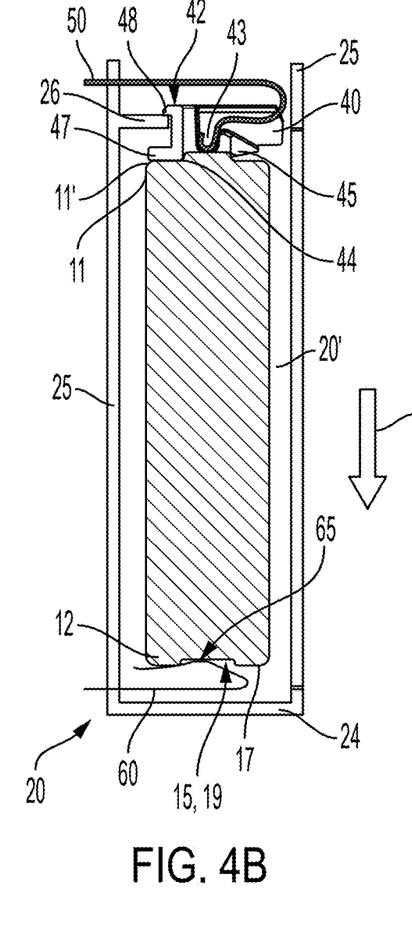
FIG. 4B, in a side sectional view, shows a battery compartment and a battery with a battery connection according to an embodiment of the disclosure, wherein the battery is inserted correctly, and wherein the battery is in one extreme position relative to the battery compartment.
Figure 4C:
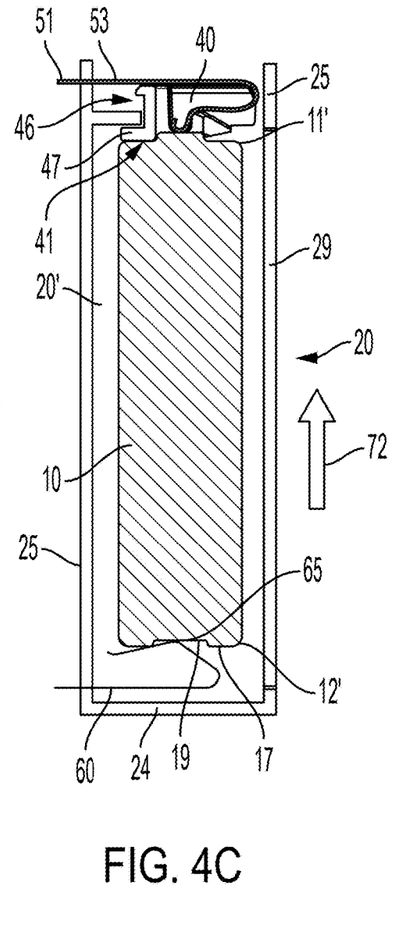
FIG. 4C shows the battery compartment, battery, and battery connection of FIG. 4B, wherein the battery is in another one extreme position relative to the battery compartment.
Figure 4D:
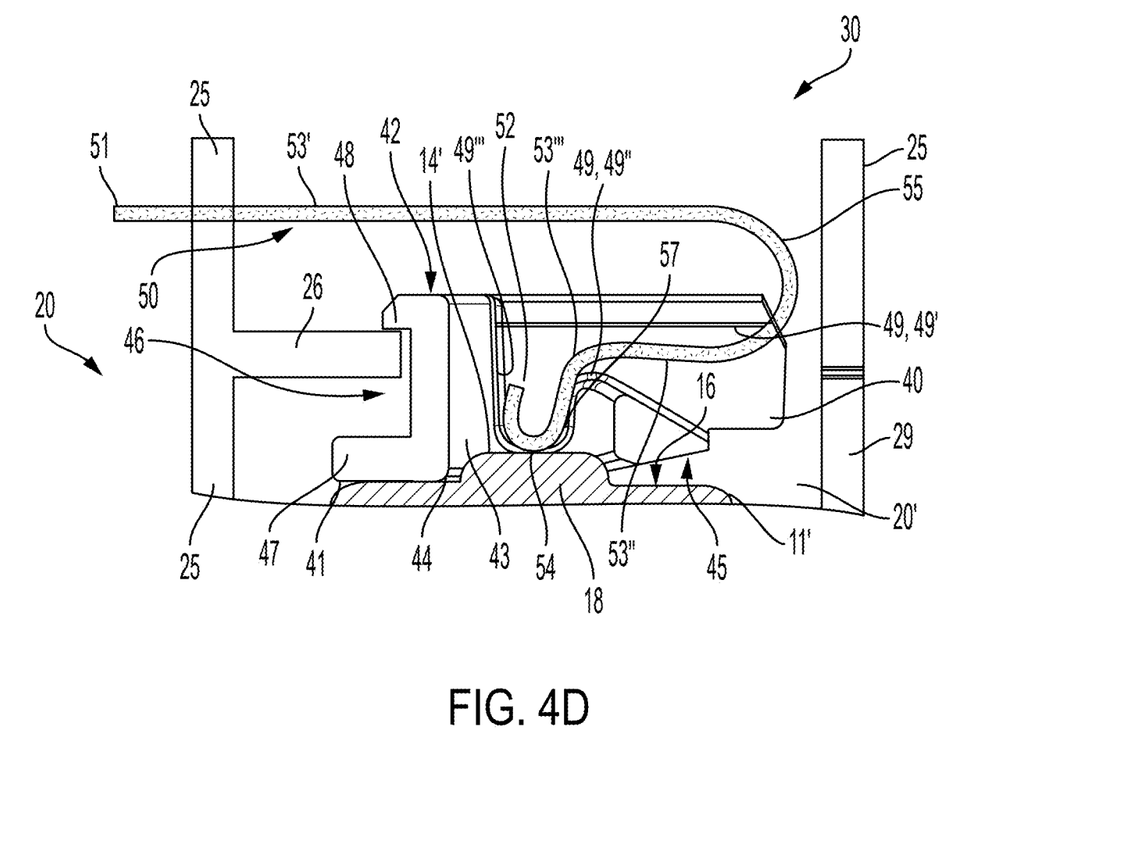
FIG. 4D is an enlarged, side section view of the battery compartment of FIG. 4B.

FIGS. 4A-D shows an electrical battery, or simply battery 10, placed in a battery compartment 20, according to the disclosure. FIG. 4A shows a battery 10 incorrectly inserted in the battery compartment 20. FIGS. 4B-C shows a battery 10 correctly inserted in the battery compartment 20, and in two different extreme positions, which will be described in more detail further below. FIG. 4D shows details of a first end 21 of a battery convert 20 with a battery 10 and a battery connection according to the disclosure.

The battery 10 shown is of a type with an elongate body 13 having a first end 11 and a second end 12. The body 13 of the battery 10 may have a circular cross-section, i.e. be cylindrical, having a cylindrical sidewall 13' extending between the first end 11 and the second end. However, in principle the body 14 may alternatively have other cross-sectional shapes (not shown), for example triangular, square, rectangular, etc. In such cases, the body 13 has a set of sidewalls extending between the first end 11 and the second end, rather than a single cylindrical sidewall.

A first end surface 16 is defined at the first end 11 of the body 13 of the battery. A first rim 11' is defined between the first end surface 16 and the sidewall 13 (or set of sidewalls).

A second end surface 17 is defined at the second end 12 of the body 13 of the battery. A second rim 12' is defined between the second end surface 17 and the sidewall 13' (or set of sidewalls).

The first end of the battery 10 comprises a positive terminal or pole 14 of the battery 10, and the second end 12 comprises a negative terminal or pole 15 of the battery 10.

As can be appreciated from FIGS. 4A-D, the positive terminal 14 of the battery is formed as a protruding knob 18 having a first contact surface 14', which extends above the first end surface 16 of the battery 20. The first contact surface 14' is elevated over the first end surface 16 of the battery 20.

Thereby, the knob 18 can be said to have a height (relative to the first end surface 16 of the battery).

The negative terminal (pole) 15 of the battery may—as shown in FIGS. 4A-D be formed as a flat surface, second contact surface 19. The second contact surface 19 may—as shown—be retracted (slightly) from the second end surface 17.

For example the battery 10 may be a standard size single cell cylindrical dry battery, such as an A, AA, or AAA type standard battery. AA type batteries are also known as double A, penlight or mignon batteries. The IEC 60086 system calls the AA size, R6 and the ANSI C18 names it size 15. A zinc-carbon battery in size AAA is designated by IEC as "R03", an alkaline LR03, and by ANSI C18.1 as "24". In connection with the toy figurine one or two size AAA batteries are preferably housed in the battery compartment 20. Alternatively, the battery may be an industrial battery like a 18650 Lithium cell, which may be used where industry standard (low cost, high performance) applies. Also this type of (rechargeable) battery may need to eb removed for inspection, requires correct insertion and needs a stable electrical connection to the terminals.

The battery compartment 20 forms housing for one or more batteries 10, and may comprise one or more of a first end wall 23 (FIG. 3B), a second end wall 24 (FIG. 3B, FIGS. 5A-B), a sidewall 25 (FIGS. 5A-B), and a cover 29 (FIG. 3B, FIGS. 4A-D). The battery compartment 20 may be an integrated part of an electrically powered device such as the toy figurine 100 described above, or it may be a separate entity. Regardless, the battery compartment 20 is preferably an elongate structure having a first end 21 and opposite thereto, a second end 22, see e.g. FIGS. 5A-B. At least one sidewall 25 extends between said first and second ends 21, 22, and encloses a space 20' configured in size and shape to accommodate a battery 10. It will be appreciated that the at least one side wall may be formed to at least partially enclose the battery 10. The battery compartment may further comprise a lid or hatch or cover 29, see FIGS. 3B and FIGS. 4A-D, partially or fully detachable relative to the battery compartment 20, and configured for closing an opening into the enclosed space 20' of battery compartment 20. Thereby, the cover 29 may serve to completely enclose the battery compartment 20. The cover 29 allows replacement of a battery 10 contained in the compartment. Between the opening into the battery compartment 20 and the cover 29, a gasket (not shown) may be provided in order to make the battery compartment 20 dust and/or fluid and/or air tight.

In the figures, the cover 29 is illustrated as being arranged in the side (in an opening through the side wall 25) of the battery compartment 20. However, in other—not shown—embodiments, the cover may alternative be formed in an end 21, 22 of the battery compartment, such as the second end 22.

As mentioned, the battery compartment 20 is preferably elongate in shape to correspond with the (elongate) shape of the battery 10, and having a longitudinal axis from the first end 21 to the second end 22, and which coincides with an elongate axis of the battery 10, when the battery 10 has been inserted into the battery compartment 20.

At the first end 21 of the battery compartment 20, a first spring connector 50 is arranged for forming a contact with the positive terminal 14 of the battery 10, when the battery 10 has been inserted into the battery compartment 20. Correspondingly, at the second end 22 of the battery compartment 20 a second spring connector 60 is arranged for forming a contact with the negative terminal of the battery 10, when the battery 10 has been inserted into the battery compartment 20.

The first spring connector 50 is preferably a leaf spring formed from an electrically conductive material, such as a conductive metal or metal alloy, and formed as a resilient strip. Alternatively, it may be formed in a resilient polymer material having a conductive pattern formed, such as printed, thereon, or being provided with electrically conductive properties in other ways known in the art. However, it will be understood that also types of coil springs may be used. In any case, the first spring connector 50 is electrically connected or connectable to a positive side of an electrical circuit (not shown) of an electrical device, such as the toy figurine 100 described above.

The first spring connector 50 is further formed such that is has an electric contact surface, first electric contact surface 54, configured for contacting the positive terminal 14 of a battery inserted into the battery compartment 20.

The first spring connector 50 is provided with a resilience to maintain a contact of the first electric contact surface 54 with the positive terminal 14 of a battery 10, when the battery 10 is inserted into the battery compartment 20.

Figure 5A:
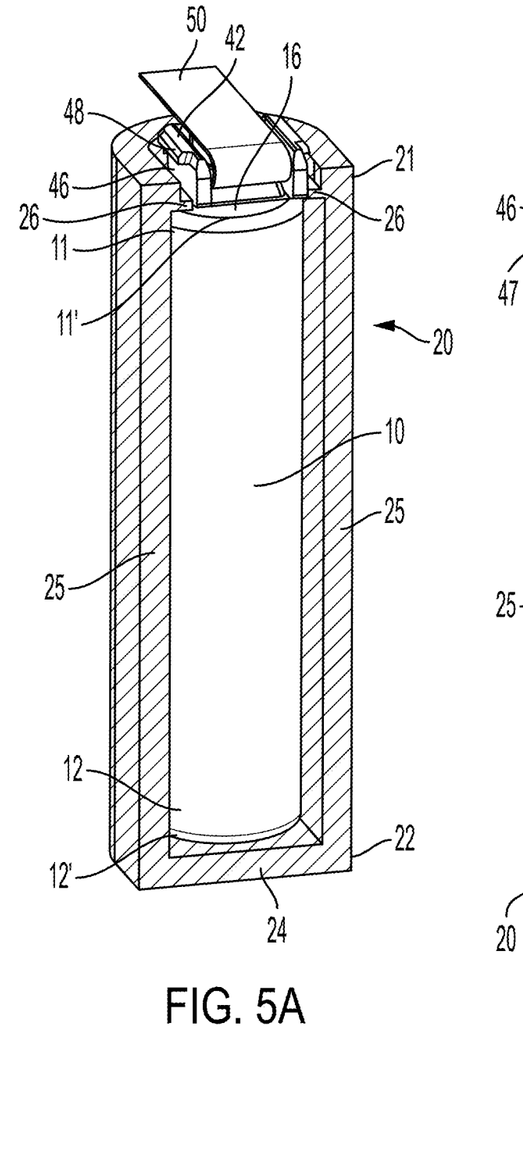
FIG. 5A, in a perspective view, shows a battery compartment with a battery connection according to an embodiment of the disclosure, where a battery is inserted in the battery compartment.
Figure 6:
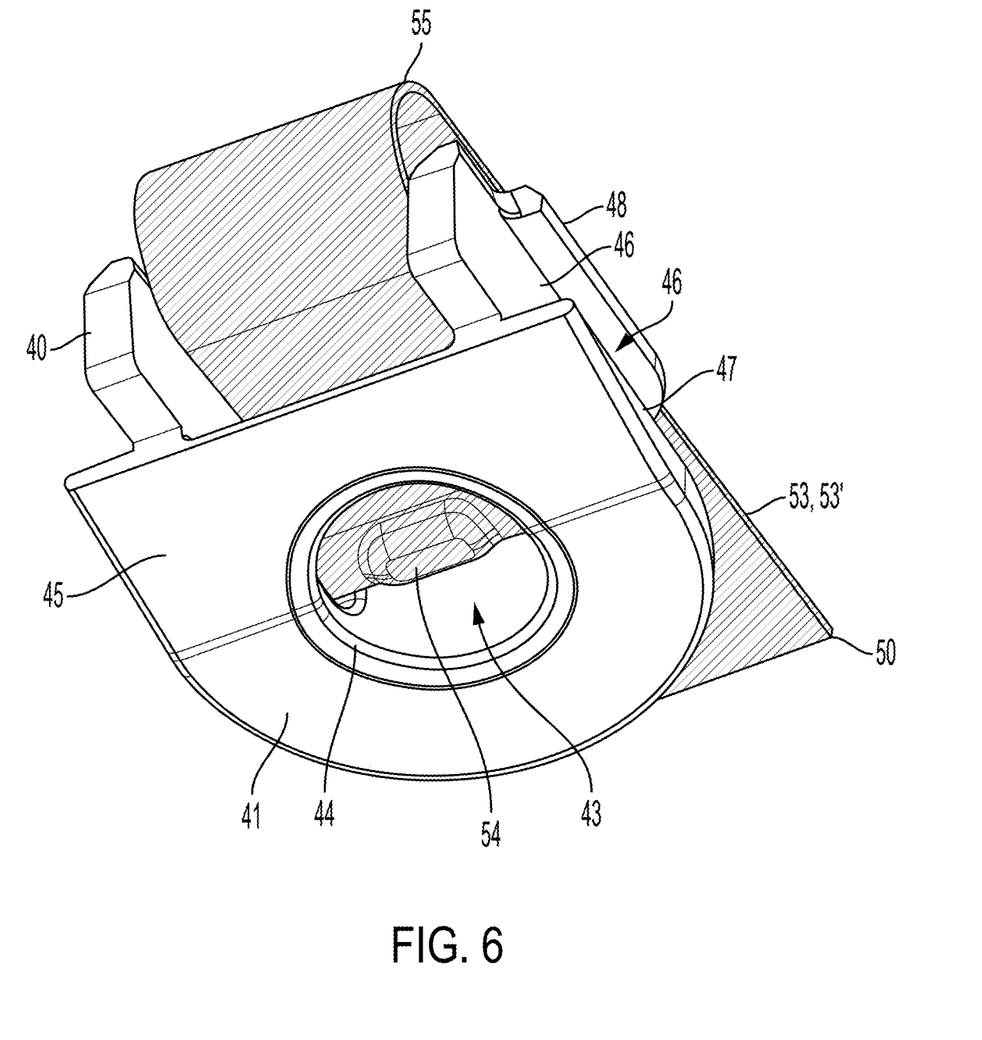
FIG. 6, in a perspective view, shows a battery-shoulder receiving part, for a battery connection according to an embodiment of the disclosure.
Figure 7:
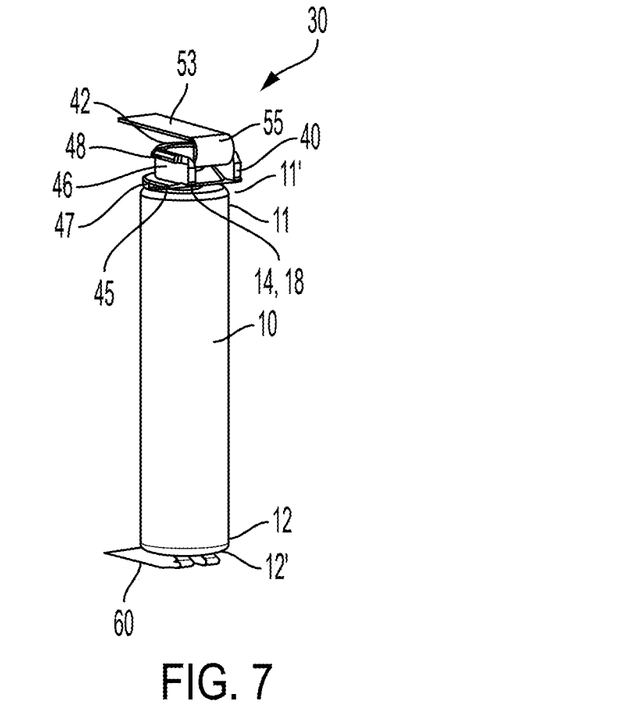
FIG. 7, in a perspective view, shows a battery and principle parts of a battery connection according to an embodiment of the disclosure.

As shown in FIGS. 4A-D, 5B and 7, the first spring connector 50 may comprise a strip of conductive material bend to allow a resilience of the first spring connector 50, and such that the first spring connector 50 has a contact surface, first electric contact surface 54, configured for making contact with a positive terminal 14 of a battery 10 inserted into the battery compartment 20. In FIGS. 5-7, the strip of conductive material is a flat sheet (leaf spring). But, as may be realized from FIGS. 4A-D and 8, the same may be achieved from a type of coil spring, or coiled spring.

The second spring connector 60 is a spring formed from an electrically conductive material, such as a conductive metal or metal alloy. Alternatively, it may be formed in a resilient polymer material having a conductive pattern formed, such as printed, thereon, or being provided with electrically conductive properties in other ways known in the art. The second spring connector 60 is electrically connected or connectable to a negative side of an electrical circuit (not shown) of an electrical device, such as the toy figurine 100 described above.

The second spring connector 60 is further formed such that is has an electric contact surface, second electric contact surface 65, configured for contacting the negative terminal 15 of a battery inserted into the battery compartment 20.

The second spring connector 60 is further provided with a resilience to maintain a contact between the electric second contact surface 65 and the negative terminal 15 of a battery 10, when inserted into the battery compartment 20.

The second spring connector 60 may be in the form of a coil spring (not shown), for example formed in a wound wire (cylindrically or conically), and having a longitudinal axis along windings of the spring, where the longitudinal axis of the spring is oriented in the same direction as the longitudinal axis of the battery housing 20. In such cases the upper end winding(s) may form an electric contact surface, second electric contact surface 65, configured for making contact with a negative terminal 14 of a battery 10.

However, as shown in FIGS. 4A-D, 5B and 7, the second spring connector 60 may alternatively comprise a strip of conductive material, such as a metal or metal alloy, bend to allow a resilience of the second spring connector 60, and such that the second spring connector 60 has an electric contact surface, second electric contact surface 65, configured for making contact with a negative terminal 15 of a battery 10, when the battery 10 is inserted in the battery compartment 20.

The battery compartment 20 with the first spring connector 50 and the second spring connector 60 is formed such that the distance between the first electric contact surface 54 on the first spring connector 50 and the second electric contact surface 65 on the second spring connector 60 corresponds (is approximately identical) to the distance between the first electric contact surface 14' on the knob 18 of the battery 10 and the second electric contact surface 19 of the battery 10 intended for insertion in the battery compartment 20.

At the first end of the battery compartment 20, a battery connection 30 according to an aspect of the disclosure is provided. The battery connection 30 comprises a battery-shoulder receiving part 40 and the first spring connector 50 referred to above.

The battery-shoulder receiving part 40 is slidably arranged in the battery compartment 20, in the longitudinal direction along the above mentioned longitudinal axis of the battery compartment 20, which will be explained in more detail below. Slideable may include linearly translational.

The battery-shoulder receiving part 40 has a first surface 41 facing downward or towards the inner battery receiving space 20' of the battery compartment 20. The first surface 41 of the battery-shoulder receiving part 40 is configured for contacting the first surface 16 of the battery 10.

The battery-shoulder receiving part 40 further has a second surface 42 facing upwards or away from the inner battery receiving space 20' of the battery compartment 20.

The battery-shoulder receiving part 40 has a thickness, i.e. it extends a distance in the same direction as the longitudinal axis of the battery compartment 20. This thickness or distance is preferably considerably smaller than the length of the space 20' enclosed by the battery compartment 20, at least when the battery compartment is configured for a standard type elongate battery such as AAA, AA, or A—type batteries 10.

Further an opening/aperture/hole 43 is provided in—and extending into—the battery-shoulder receiving part 40 from the first surface 41 and towards the second surface 42. The opening 43 is configured for receiving the knob 18 forming the positive terminal 14 of the battery 10. A lower rim 44 at least partially surrounds the opening 43 in the battery-shoulder receiving part 40. The opening 43 with the lower rim 44 is sized and shaped to allow the knob 18 of a battery 10 to be inserted therein. Thus, the cross-sectional shape (cross section perpendicular to longitudinal axis of battery compartment 20) of the opening 43 is preferably the same or adapted to receive the knob 18 of the battery. So if the knob 18 of the battery is cylindrical, the opening 43 could be cylindrical, and with a slightly larger diameter.

The first spring connector 50 is shaped such that it may cooperate with a set of surfaces formed on the battery-shoulder receiving part 40, in such a way that the battery-shoulder receiving part 40 is connected to the first spring connector 50, such that the movement of the battery-shoulder receiving part 40 is controlled by the resilience of the first spring connector 50 to move with the first spring connector 50. Further, the battery-shoulder receiving part 40 and the first spring connector 50 are formed such that the first electric contact surface 54 of the first spring connector 50 is arranged recessed away from, or above, the lower rim 44 of the opening 43.

Thereby, contact between the positive terminal 14 of the battery and the first electric contact surface 54 of the first spring connector 50 can only be obtained if the battery is correctly inserted into the battery compartment 20. This may be appreciated by comparing FIG. 4A with FIGS. 4B-D.

In FIG. 4A, a battery 10 is incorrectly inserted into the battery compartment 20. In the figure, the battery 10 is inserted with the knob 18 forming the positive terminal 14 of the battery 10 facing downwards, while the first spring connecter 50 for connecting to the positive side of the electric circuit is in the upper part of the figure. As can be seen, the positive terminal 14 is in contact with the second spring connector 60, which is connected/connectable to the negative side of the—not shown—electrical circuit. However, the recessed second electric contact surface 19 at the second end 12 of the battery is unable to make contact with the first electrical connection surface 54 on the first connector spring 50, at least because the first electrical connection surface 54 on the first connector spring 50 is provided recessed behind the lower rim 44 of the opening 43.

Thereby, it is achieved that even if an unskilled user—e.g. a child—inserts a battery incorrectly into the battery compartment 20, no electrical contact is made between the battery and the electrical circuit of the electrical device, such as the toy figurine 100 described above. Thus damage to—or malfunction of—the electronic components of the device/toy figurine 100, which may be dependent on correctly oriented DC power, may be avoided.

The first electric contact surface 54 of the first spring connector 50 being recessed behind/above the lower rim 46 of the opening 44 in the battery-shoulder receiving part 40 may also be appreciated from FIG. 6, showing a the battery-shoulder receiving part 40 according to an embodiment of the disclosure is a perspective view from below, or from the battery side of the battery compartment 20.

As is evident from FIG. 4D, the first electrical connection surface 54 on the first connector spring 50 is recessed relatively to the first surface 41 and the lower rim 44 of the opening 43 of the battery-shoulder receiving part 40 by a distance slightly less than the height of a knob 18 of a battery 10.

Thereby, when the knob 18 of the battery is inserted into the opening 43 of the battery-shoulder receiving part 40, the first contact surface 14' on the knob 18 will always be in contact with the first electrical connection surface 54 on the first connector spring 50, when the first end surface 16 of the battery is in contact with the first surface 41 of the battery-shoulder receiving part 40 as illustrated in FIG. 40.

This is shown in FIGS. 4B-D, where the battery 10—in contrast to the situation shown in FIG. 4A, has been correctly inserted. That is, the knob 18, forming the positive terminal of the battery 10 has been oriented upward in the figure, such that it may be brought into contact with the first spring connector 50. The second contact surface 19, forming the negative terminal 15 of the battery 10 is in contact the second spring connector 60.

Thereby, the—not shown—electric circuit of the electric device, such as the toy figurine 100, may be supplied with electric current of the correct polarity.

The first spring connecter 50 shown in the figures is formed as elongate strip as discussed above, the first spring connector 50 having a first end 51, and opposed thereto a second end 52, and a body 53 there between. When the first spring connecter 50 is formed as a sheet of material the body 53 may be called a flat body. We note that the first spring connecter 50 may also be formed in thread as a coil spring.

The first end 51 of the first spring connecter 50 may extend through a sidewall 35 of the battery compartment 20 and connect to or be connectable to a circuit (not shown) as mentioned above. The part of the body 53 of the first spring connecter 50 extending into the battery compartment 20 is connected to the battery-shoulder receiving part 40 and further comprises the above mentioned first contact surface 54 of the first spring connector 50.

In principle the first spring connector may be a straight sheet or thread of material. However, in the embodiments shown—see e.g. FIG. 4D, the part of the body 53 extending into the battery compartment 20 may comprise a series of bends. In cases where the first spring connecter 50 is formed in a thread these bends may instead be formed by coils of the thread.

The mentioned bends/coils may increase the flexibility/elasticity of the spring. Further, the bends/coils allows for easier attachment of the first spring connector to the battery-shoulder receiving part 40.

In any case the body 53 may intersect the sidewall orthogonally, and is fixed thereto.

As shown in FIG. 4D, the body 53 may comprise a first bend 55 (or a coil), which turns the body 180° to have a first portion 53' extending from one sidewall 25 towards an opposite sidewall 25 of the battery compartment, and a second portion 53" extending from the first bend 55 towards the first mentioned sidewall, and parallel to the first portion 53' of the body 53. The first bend 55 (or coil) especially serves to provide increased flexibility, however a sub-portion of the bend (or coil) may support against a surface 49' of the battery-shoulder receiving part 40 in order to provide a hold there against.

The flat body 53 may comprise a second bend 56 (or coil) turning the body 53 approximately 90° such that the body 53 has a third portion 53''' which is approximately orthogonal relative to the first and second portions 53', 53". The second bend 56 (or coil) or a sub-portion thereof may support against another surface 49" of the battery-shoulder receiving part 40 in order to provide a further hold there against.

As shown, the body 53 may be provided with a third bend 57 (or coil), approximately 180°, at the extreme second end 52 of the first spring connector 50. In this case the first electrical contact surface 54 of the first spring connector 50 is provided at the bottom of the U-shape of the third bend 57. The third bend 57 (or coil) further cooperates with correspondingly U-shaped surfaces 49''' provided as flanges on inside surfaces of the battery-shoulder receiving part 40 in order to provide a further hold there against.

In other embodiments other attachment means 49 than the surfaces 49', 49", 49''' cooperating with the bends 55, 56, 57 and the portions 53', 53", 53''' on the first spring connector 50 may be utilized for attaching the battery-shoulder receiving part 40 to the first spring connector 50. For example, a straight portion of the first spring connector 50 may be clamped between opposed surfaces provided in of the shoulder receiving part 40, or the shoulder receiving part 40 and the first spring connector may be glued to each other or fastened to each other in other ways.

The shoulder receiving part 40 further comprises a guide track 46 formed as an indented portion of an outer sidewall of the shoulder receiving part 40 between a first peripheral flange 47 formed at the end of the shoulder receiving part 40 facing the inner battery receiving space 20' of the battery compartment 20, and a second peripheral flange 48 formed at the end of the shoulder receiving part 40 facing away from the inner battery receiving space 20' of the battery compartment 20.

Figure 5B:
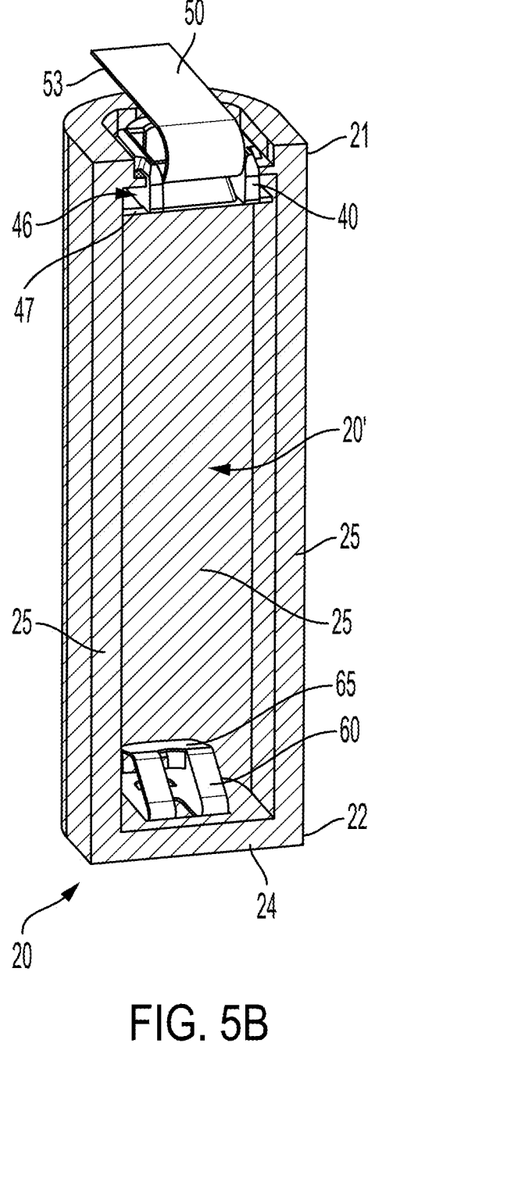
FIG. 5B, shows the battery compartment of FIG. 5A without a battery inserted, and showing details of the battery connection.

As shown in e.g. FIG. 4D and FIGS. 5A-B, the guide track 46 is configured for cooperating with a guide member 26 formed e.g. as a flange extending inward into the battery compartment 20.

The guide track 46 has a length in the direction of the longitudinal axis of the battery compartment, defined between a distance between the first and the second peripheral flanges 47, 48. The flange forming the guide member 26 further has a thickness, defined in the direction of the longitudinal axis of the battery compartment 20.

The length of the guide track 46 and the thickness of the flange forming the guide member 26 are coordinated to allow the shoulder receiving part 40 to move inside and relative to the battery compartment 20 in the direction defined by the longitudinal axis of the battery compartment 20. The movement of the shoulder receiving part 40 is constricted by abutment of the flange forming the guide member 26 against the first peripheral flange 47 in one extreme position shown in FIG. 4C, and abutment of the flange forming the guide member 26 against the second peripheral flange 48 in another extreme position, as shown in FIG. 48.

In not shown embodiments, the flange forming the guide member 24, and the guide track 46 between the first peripheral flange 47 and the second peripheral flange 58, may be reversed between sidewall 25 of the battery compartment 20 and the battery-shoulder receiving part 40.

As the shoulder receiving part 40 is connected to the first spring element 50, the travel/movement of the shoulder receiving part 40 relative to the walls of the battery compartment is further limited by the resilience of the first spring element 50. In an embodiment, the first spring element 50 may be biased to force the shoulder receiving part 40 towards the inner battery receiving space 20' of the battery compartment 20.

In another embodiment, the first spring element 50 may be biased to centre the shoulder receiving part 40 such that the flange of the guide member 26 is located at half the length between the first and the second flanges 47, 48 of the shoulder receiving part 40 when there is no load on the shoulder receiving part 40.

When a battery 10 has been inserted into the inner battery receiving space 20' of the battery compartment 20 as shown in e.g. FIGS. 4B-C, the resilience of the first spring connector 50 and the second spring connector allows the battery to move relative to the wall of the battery compartment 20 in the direction defined by the longitudinal axis of the battery compartment 20, between the two extreme positions shown in FIG. 4B and FIG. 4C, respectively, the two extreme positions defined by the first and second peripheral flanges 47, 48, and the distance there between.

FIG. 4B shows a situation, where the battery compartment 20 with a battery 10 correctly inserted, is subjected to an upwardly directed force (relative to the battery compartment as oriented in the figure). This may occur for example if the battery compartment is moved downward towards a surface, and impacts on the surface, stopping the motion relative to the surface. The upward force will cause the battery to temporarily continue its downward motion as indicated by the arrow 71 until the relative movement is stopped by the flange forming the guide member 26 abuts the second flange 48.

An opposite situation is illustrated in FIG. 4C, where an upwardly directed motion of the battery compartment is stopped, causing the inserted battery in temporarily continuing it's upwardly directed motion as indicated by the arrow 72, until it is stopped by abutment of the flange forming the guide member 26 on the first flange 47 of the shoulder receiving part 40.

Thereby, it is secured that—for example when an impact to the electric device in which the battery compartment is arranged (or attached to) occurs—the battery 10 is allowed to move without the electric terminals 14, 15 of the battery 10 becoming disconnected from the first contact surface 54 of the first spring connector 50 and the second contact surface 65 of the second spring connector 60. Thus, a stable electrical energy supply to an electrical circuit (not shown) of an electrical device, such as the toy figurine 100 described above, is secured.

FIG. 5B shows a battery compartment 20 according to an embodiment of the disclosure, without a battery 10 inserted in the inner battery receiving space 20'. From FIG. 5B it may be appreciated that the shoulder receiving part 40 may be biased towards the inner battery receiving space 20' of the battery compartment 20 when the battery 10 is not inserted. FIG. 5B also shows an embodiment of a second spring connector 60 formed by a piece of flexible conductive material bend to provide a resilience.

FIG. 5A shows the same embodiment of the battery compartment 20 as in FIG. 5B, but with a battery 10 into the inner battery receiving space 20'.

In order to ease the insertion of a battery 10 into the inner battery receiving space 20' of the battery compartment, the first surface 41 of the shoulder receiving part 40 may be provided with a ledge 45, as shown in e.g. FIG. 6, but also illustrated in FIGS. 4A-D.

FIG. 7 shows a battery 10 and the cooperation with the second spring connector at the second end 12 (and the negative terminal 15) of the battery 10, and the cooperating first spring connector 50 and shoulder receiving part 40 at the first end 11 (and the positive terminal 14) of the battery 10.

Figure 8:
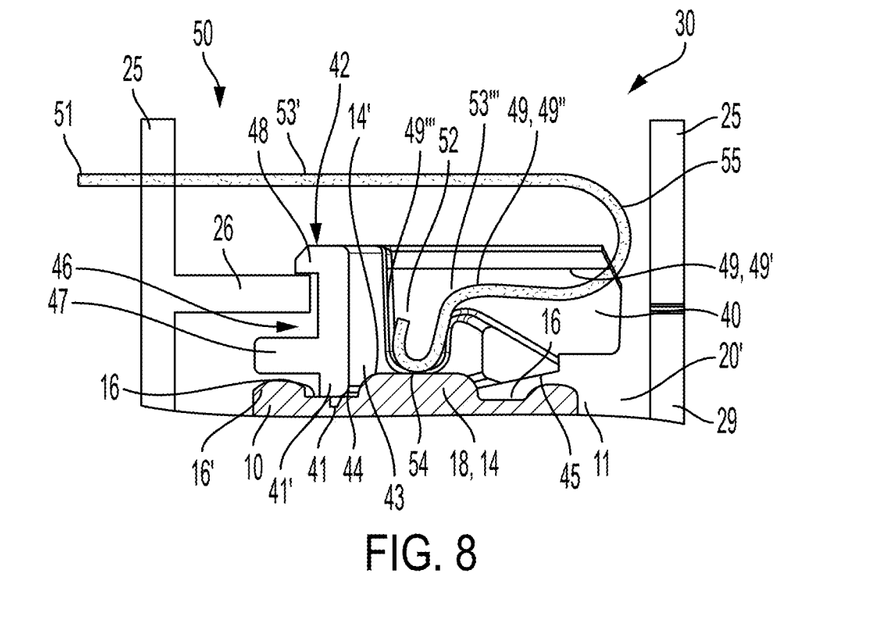
FIG. 8 in a detailed view correspond to that in FIG. 4D, shows an embodiment of the battery compartment and a battery-shoulder receiving part configured for cooperating with a different type of battery.

FIG. 8 shows detail of a battery compartment with a battery-shoulder receiving part 40 configured for receiving a different type of battery, for example an industrial type batteries like an 18650 Lithium cell applicable to use with an industry standard (low cost, high performance), but need a stable electrical connection to the terminals. In In such batteries 10, the knob 18 with the positive terminal 14, may not necessarily comprise the furthest extending surface as the end surface 16 from which the knob 18 extends may be recesses relative to circumferential shoulder 16' of the battery. In order to accommodate batteries 10 designed in such a way, the battery-shoulder receiving part 40 may as shown in FIG. 8, be equipped with an inwardly (relative to the battery receiving space 20') extending flange 41' on which the first surface 41 of the battery-shoulder receiving part 40 is formed. The battery shoulder receiving part also comprise an opening 43 comprising a lower rim 44, i.e. a rim surrounding the opening in or though the battery shoulder receiving part 40 Again, the first surface 41 of the battery-shoulder receiving part 40 is configured for abutting on the circular and recessed first end surface 16 of the battery 10 between the shoulder 16' and the knob 18. On other respects, the embodiment shown in FIG. 18 corresponds to the embodiments described in connection with FIG. 4D.

It is to be noted that the figures and the above description have shown the example embodiments in a simple and schematic manner. Many of the specific mechanical details have not been shown since the person skilled in the art should be familiar with these details and they would just unnecessarily complicate this description

LIST OF PARTS 10 battery/electrical battery
11 first end of battery
11' first rim at first end of battery between sidewall and first end surface
12 second end of battery
12' second rim at second end of battery between sidewall and second end surface
13 body of battery
13' sidewall of body of battery
14 positive terminal/pole of battery
14' first contact surface on the battery, forming positive terminal/pole of the battery
15 negative terminal/pole of battery
16 first end surface of battery
17 second end surface of battery
18 protruding knob forming positive terminal/pole of the battery
19 second contact surface of battery
20 battery compartment
20' inner battery receiving space of the battery compartment
21 first end of battery compartment
22 second end of battery compartment
23 (first end wall of battery compartment)
24 second end wall of battery compartment
25 sidewall of battery compartment
26 guide element, guide member for guiding battery-shoulder receiving part
29 hatch/cover for battery compartment
30 battery connection
40 battery-shoulder receiving part
41 first surface of movable battery-shoulder receiving part
42 second surface of movable battery-shoulder receiving part
43 opening formed in movable battery-shoulder receiving part
44 lower rim, rim surrounding opening though battery shoulder receiving part
45 ledge of first surface of the battery-shoulder receiving part
46 guide element, guide track formed in the battery-shoulder receiving part
47 first peripheral flange of the battery-shoulder receiving part
48 second peripheral flange of the battery-shoulder receiving part
49 attachment means
49' surface
49" surface
49''' surface
50 first spring connector
51 first end of the first spring connector
52 second end of the first spring connector
53 body of the first spring connector extending between the first and second ends
54 first electric contact surface; electric contact surface of first end spring connector
55 first bend (or coil) of the body of the first spring connector
56 second bend (or coil) of the body of the first spring connector
57 third bend (or coil) of the body of the first spring connector
60 second spring connector
65 second electric contact surface; electric contact surface of second end spring connector
90 toy system
100 toy figurine
101 toy figurine first part
102 housing of toy figurine first part
103 toy figurine second part, connectable to toy figurine first part
110 digital screen
117 head
118 body
119 neck/circumferential indentation
120 arm
121 hand
123 eye
124 nose
126 mouth
127 hair relief
140 connection means, knobs
200 physical play environment
210 start marker
211 one type of marker
212 another type of marker
213 marker
214 end marker
221, 222, 223, 224, 225, 226, 227, 228 toy construction elements of a physical play environment physical play environment
300 user.

What is claimed is:

1. A toy figurine comprising:
one or more electronic components; and
a battery compartment for receiving a battery for powering the one or more electronic components, the battery compartment comprising:
an inner battery receiving space configured for receiving a battery;
a first spring connector in the form of a leaf spring comprising a flat body, the first spring connector being provided at a first end of the battery compartment, and having a first electric contact surface configured for contacting a positive terminal of the battery and one end fixedly connected to a wall of the battery compartment;
a second spring connector provided at a second end of the battery compartment, and having a second electric contact surface configured for contacting a negative terminal of the battery and one end fixedly connected to a wall of the battery compartment; and
a battery-shoulder receiving part movably arranged in the battery compartment,
wherein the battery-shoulder receiving part is attached to a portion of the first spring connector;
wherein the battery-shoulder receiving part comprises an opening configured for receiving a knob protruding from a first end surface of said battery, the opening being formed in and through a first surface configured for abutting on the first end surface of the battery,
wherein the first contact surface is recessed relative to a rim between said opening and said first surface of the battery-shoulder receiving part, and
wherein cooperating guide elements are formed between a wall of the battery compartment and the battery-shoulder receiving part, and configured to allow only linear translational movement of the battery-shoulder receiving part relative to the wall in a direction along a longitudinal axis of the battery compartment.

2. A toy figurine according to claim 1, wherein the first spring connector comprises at least a first bend providing a first portion and a second portion of the flat body, such that first portion is parallel to the second portion,
   wherein the first portion extends from a wall of the battery compartment, and wherein the battery-shoulder receiving part is connected to the second portion; and
   wherein the first contact surface of the first spring connector is provided on a third portion of the body which is resilient relative to the second portion of the body.

3. A toy figurine according to claim 1, wherein the cooperating guide elements comprise:
   a guide member extending from a sidewall of the battery compartment; and
   a guide track formed in the battery-shoulder receiving part.

4. A toy figurine according to claim 3, wherein the guide track is defined between a first peripheral flange formed at a first end of the battery-shoulder receiving part facing the internal space, and a second peripheral flange formed at a second end of the battery-shoulder receiving part facing away from the internal space.

5. A toy figurine according to claim 1, wherein the first surface configured for abutting on the first end surface comprises a ledge.

6. A toy figurine according to claim 1, wherein at least one of the one or more electronic components are electronically connected to the first spring connector and the second spring connector.

7. A battery compartment for a toy figurine comprising:
   an elongate cavity extending between a negative and positive contact surface, the elongate cavity configured to receive a battery;
   a spring connector defining the positive contact surface, enabling maneuverability of the positive contact surface; and
   a battery shoulder mounted to the spring connector, the battery shoulder defining an aperture shaped to house a positive terminal of a battery,
wherein:
   the positive contact surface defined by the spring connector is positioned within the aperture.

8. A battery compartment according to claim 7, further comprising an annular lip positioned at an extremity of the aperture, wherein the lip is configured to obstruct contact between a negative terminal of the battery and the positive contact surface of the spring connector.

9. A battery compartment according to claim 7, wherein the spring connector includes a first 180 bend and a second 90 degree bend, enabling elastic movement of the positive contact surface.

10. A battery compartment according to claim 7, further comprising an external guide track defined by a first and second peripheral flange of the battery shoulder, the toy figurine having a guide configured to mobilize within the guide track and limit movement of the battery shoulder.

11. A battery compartment according to claim 7, wherein the positive contact surface forms an arc configured to contact the positive terminal of the battery by extending proximate to the aperture.

12. A battery compartment according to claim 11, wherein the arc of the positive contact surface cooperates with internal flanges defined by an interior of the battery shoulder such that the battery shoulder supports the positive contact surface.

13. A battery compartment assembly for a toy figurine with an elongate cavity configured to receive a battery, the battery compartment assembly comprising:
   a first spring connector defining a positive contact surface for connection to the battery received in the elongate cavity;
   a battery shoulder mounted to the spring connector, the battery shoulder defining a hole shaped to fit a positive terminal of the battery therethrough; and
   a second spring connector defining a negative contact surface for connection to the battery received in the elongate cavity, the second spring connector configured to elastically maneuver to lengthen the elongate cavity.

* * * * *